UNITED STATES PATENT OFFICE.

HUGO HELLER, OF COLOGNE, GERMANY.

PROCESS OF SOFTENING WATER.

1,247,833. Specification of Letters Patent. Patented Nov. 27, 1917.

No Drawing. Application filed March 27, 1916. Serial No. 87,104.

*To all whom it may concern:*

Be it known that I, HUGO HELLER, subject of the Emperor of Austria, residing at Cologne, Germany, Luxemburgerstrasse 150, have invented certain new and useful Improvements in Processes of Softening Water, of which the following is a specification.

In an earlier application, Serial No. 872,031, I have described a process for softening water in which the water to be treated is mixed with commercial phosphate of sodium, that is to say with di-sodium phosphate and the temperature thereof raised to the boiling point.

I have now found that even more favorable results may be obtained if instead of following the method described in the aforesaid application, the water is brought for a short time, about five minutes, to the boiling temperature prior to the addition thereto of phosphate of sodium and then again maintaining the water at approximately boiling temperature. The second heating may ordinarily be discontinued after a few minutes. The preliminary boiling of the water acts to reduce or remove the temporary hardness of the water and the permanent hardness thereof is overcome by the treatment with hot phosphate of sodium.

Practical experience has shown that by this method or process the reduction in degree of hardness of any water is increased over that which is effected by treating it according to the process of my aforesaid earlier application. It appears that the water is softened to a greater degree by the addition of the phosphate of sodium after a short preliminary boiling and that in fact a small amount of phosphate of sodium added under such conditions is more efficient than the addition of a considerably larger quantity without such preliminary heating and strictly in accordance with the process of the aforesaid earlier application. The resulting water is exceptionally soft and neutral and is particularly adapted for use in steam boilers.

This step of preliminarily heating the water is apparently one of importance when phosphate of sodium is used as the softening medium, as tests have shown that more favorable results are not obtained by thus preliminarily heating the water when the softening is to be effected by the use of lime soda or pure soda. With the lime soda process or pure soda process of softening water there appears to be practically no difference whether the water to be treated is boiled prior to the addition of the softening material or only after such addition.

Having thus described the invention what is claimed is:

1. The hereindescribed process of producing a neutral soft water by the use of di-sodium phosphate which comprises heating the water to be treated prior to the addition of the di-sodium phosphate, then adding di-sodium phosphate and continuing the heating for a short time.

2. The hereindescribed process of producing a neutral soft water which comprises heating hard water to boiling temperature, adding di-sodium phosphate to the preliminarily heated water, and continuing the heating of the water.

3. The hereindescribed process of producing a neutral soft water which comprises heating the water to be treated for a few minutes at boiling temperature, adding di-sodium phosphate to the preliminarily heated water, and maintaining the water at a boiling temperature for a few minutes.

In testimony whereof I affix my signature in presence of two witnesses.

HUGO HELLER.

Witnesses:
ERNST SCHMITTE,
EMIL SCHUBERT.